(12) United States Patent
Siomina et al.

(10) Patent No.: US 9,462,529 B2
(45) Date of Patent: Oct. 4, 2016

(54) METHOD AND APPARATUS FOR ACCOUNTING OF CELL RELATED DATA

(75) Inventors: Iana Siomina, Solna (SE);
Muhammad Kazmi, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 679 days.

(21) Appl. No.: 13/503,846

(22) PCT Filed: Mar. 28, 2012

(86) PCT No.: PCT/SE2012/050339
§ 371 (c)(1),
(2), (4) Date: Apr. 24, 2012

(87) PCT Pub. No.: WO2012/177204
PCT Pub. Date: Dec. 27, 2012

(65) Prior Publication Data
US 2013/0258875 A1    Oct. 3, 2013

Related U.S. Application Data

(60) Provisional application No. 61/499,689, filed on Jun. 21, 2011.

(51) Int. Cl.
*H04J 1/16* (2006.01)
*H04W 36/32* (2009.01)
(Continued)

(52) U.S. Cl.
CPC ............. *H04W 36/32* (2013.01); *G01S 5/06* (2013.01); *H04W 36/04* (2013.01); *H04W 36/30* (2013.01); *H04W 36/36* (2013.01); *H04W 36/38* (2013.01); *H04W 64/00* (2013.01); *H04W 84/042* (2013.01)

(58) Field of Classification Search
CPC ............ H04W 36/0033; H04W 36/0055; H04W 36/0061; H04W 36/0083; H04W 36/245; H04W 36/32; H04W 36/36; H04W 36/38; H04W 48/02; H04W 48/04; H04W 48/06; H04W 48/20; H04W 64/003; H04W 36/04; H04W 36/30; H04W 64/00; H04W 84/042; G01S 5/06
USPC ................. 370/252, 254, 328, 331
See application file for complete search history.

(56) References Cited

U.S. PATENT DOCUMENTS

| | | | |
|---|---|---|---|
| 5,943,621 A | * | 8/1999 | Ho ........................ H04W 60/00 455/440 |
| 6,385,454 B1 | | 5/2002 | Bahl et al. |

(Continued)

FOREIGN PATENT DOCUMENTS

| | | |
|---|---|---|
| WO | 2004/062178 A2 | 7/2004 |
| WO | 2011/039930 A1 | 4/2011 |
| WO | 2012/173561 A2 | 12/2012 |

OTHER PUBLICATIONS

International Search Report in related International Application No. PCT/SE2012/050339, mailed Sep. 6, 2012.

(Continued)

*Primary Examiner* — Peter Cheng
(74) *Attorney, Agent, or Firm* — Patent Portfolio Builders PLLC (57) ABSTRACT

A method in a network node for performing network tasks based on a user equipment trajectory includes the network node receiving cell change information from a user equipment wherein the cell change information further includes user equipment trajectory data based on cell parameters of visited cells in a user equipment trajectory. The method in a user equipment for collecting cell change information associated with a cell change includes the user equipment storing the cell change information within the user equipment. The cell change information is sent to the network node for performing network tasks.

15 Claims, 7 Drawing Sheets

(51) Int. Cl.

| | | |
|---|---|---|
| *H04W 36/36* | (2009.01) | |
| *H04W 36/30* | (2009.01) | |
| *G01S 5/06* | (2006.01) | |
| *H04W 36/04* | (2009.01) | |
| *H04W 36/38* | (2009.01) | |
| *H04W 64/00* | (2009.01) | |
| *H04W 84/04* | (2009.01) | |

(56) References Cited

U.S. PATENT DOCUMENTS

| | | |
|---|---|---|
| 7,002,489 B1 | 2/2006 | Denker et al. |
| 8,559,339 B1 * | 10/2013 | Talley .................... H04W 4/00 370/255 |
| 2010/0173626 A1 * | 7/2010 | Catovic et al. ............... 455/423 |
| 2010/0317349 A1 * | 12/2010 | Serravalle .................... 455/440 |

OTHER PUBLICATIONS

Written Opinion of the International Search Authority in related International Application No. PCT/SE2012/050339, mailed Sep. 6, 2012.

* cited by examiner

METHOD AND APPARATUS FOR ACCOUNTING OF CELL RELATED DATA

RELATED AND PRIORITY APPLICATIONS

This application claims priority under 35 U.S.C. §119(e) to U.S. Provisional Application No. 61/499,689 filed on 21 Jun. 2011, the subject matter of which is incorporated in its entirety herein by reference. This application is a national stage application of International Application No. PCT/SE2012/050339 filed on 28 Mar. 2012. This application is also related to U.S. application Ser. No. 13/503,646 filed on 23 Apr. 2012.

TECHNICAL FIELD

Example embodiments presented herein are directed towards a network node, and corresponding method therein, for performing network tasks by taking into account a user equipment cell change or trajectory. Example embodiments are also directed towards a user equipment, and corresponding method therein, for collecting cell change information based on a user equipment trajectory

BACKGROUND

In a typical cellular system, also referred to as a wireless communications network, wireless terminals, also known as mobile stations and/or user equipment units communicate via a Radio Access Network (RAN) to one or more core networks. The wireless terminals may be mobile stations or user equipment units such as mobile telephones also known as "cellular" telephones, and laptops with wireless capability, e.g., mobile termination, and thus may be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

A multi-carrier system (or interchangeably called as the carrier aggregation (CA)) allows a user equipment to simultaneously receive and/or transmit data over more than one carrier frequency. Each carrier frequency is often referred to as a component carrier (CC) or simply a serving cell in the serving sector, more specifically a primary serving cell or secondary serving cell. The multi-carrier concept is used in both HSPA and LTE. Carrier aggregation is supported for both contiguous and non-contiguous component carriers, and component carriers originating from the same eNodeB need not to provide the same coverage. Furthermore, carriers may also belong to different RATs. Below definitions are provided for various cells in a CA network.

Serving Cell: for a user equipment in RRC_CONNECTED not configured with CA there may be only one serving cell comprising the primary cell. For a user equipment in RRC_CONNECTED configured with CA, the term 'serving cells' is used to denote the set of one or more cells comprising of the primary cell and all secondary cells.

Primary Cell (PCell): the cell, operating on the primary frequency, in which the user equipment either performs the initial connection establishment procedure or initiates the connection re-establishment procedure, or the cell indicated as the primary cell in the handover procedure.

Secondary Cell (SCell): a cell, operating on a secondary frequency, which may be configured once an RRC connection is established and which may be used to provide additional radio resources.

In the downlink, the carrier corresponding to the PCell is the Downlink Primary Component Carrier (DL PCC) while in the uplink it is the Uplink Primary Component Carrier (UL PCC). Depending on user equipment capabilities, Secondary Cells (SCells) may be configured to form together with the PCell a set of serving cells. In the downlink, the carrier corresponding to aSCell is a Downlink Secondary Component Carrier (DL SCC) while in the uplink it is an Uplink Secondary Component Carrier (UL SCC).

In CA the base station, e.g., eNode B, in LTE may deactivate one or more secondary cells on the corresponding secondary carriers. The deactivation is done by the eNB using lower layer signaling, e.g., over PDCCH in LTE, using a short command such as ON/OFF, e.g., using 1 bit for each SCell. The activation/deactivation command is sent to the user equipment via the PCell. Typically, the deactivation is done when there is no data to transmit on the SCell(s). The activation/deactivation may be done independently on uplink and downlink SCell. The purpose of the deactivation is thus to enable user equipment battery saving. The deactivated SCell(s) may be activated also by the same lower layer signaling.

Herein, a cell change is referred to as changing the cell to which the user equipment is associated to. The cell change may further refer to a serving cell change, e.g., at handover in a non-CA system or when the user equipment is not configured with any SCell, a serving cell set change, e.g., in a CA system adding/removing/modifying an SCell, or a PCell change, e.g., in a CA system changing the current PCell being cell with the first cell identity to another cell with the second cell identity.

A cell change may occur during a handover (intra-frequency, inter-frequency or inter-RAT), a PCell change on the same PCC (in a CA system), or a carrier switching (changing the current PCC to another frequency carrier, which implies also PCell change). A cell change may be due to e.g. mobility, load balancing, energy saving, carrier activation/deactivation, etc.

SUMMARY

At least one object of the example embodiments presented herein may be directed towards improving the management of radio resources by taking into account a user equipment cell change. Specifically, the example embodiments may comprise taking into account cell information related to the trajectory of a user equipment. Utilizing the example embodiments, the management of radio resources for user equipments may be performed more efficiently. Specifically, a user equipment trajectory may be taken into account in the management of radio resources or used for positioning.

Some example embodiments may comprise a method in a network node for performing network tasks, the network node being comprised in a wireless communications network. The method comprises receiving cell change information, from a user equipment, the cell change information comprising user equipment trajectory data based on cell parameters of visited cells in a user equipment trajectory. The method also comprises performing at least one network task radio resources using the cell change information.

Some example embodiments may comprise a network node for performing network tasks, the network node being comprised in a wireless communications network. The network node comprising a receiving port configured to receive cell change information, from a user equipment, the cell change information comprising user equipment trajectory data based on cell parameters of visited cells in a user equipment trajectory. The network node also comprising a processing unit configured to perform at least one network task using the cell change information.

Some example embodiments may be directed towards a method in a user equipment for collecting cell change information associated with a cell change, the user equipment being comprised in a wireless communications network. The method comprises storing cell change information within the user equipment, the cell change information comprising user equipment trajectory data based on cell parameters of visited cells in a user equipment trajectory. The method also comprises sending the cell change information to another user equipment or a network node to be used in performing at least one network task.

Some example embodiments may be directed towards a user equipment for collecting cell change information associated with a cell change, the user equipment being comprised in a wireless communications network. The user equipment comprises an accounting unit configured to store cell change information within the user equipment, the cell change information comprising user equipment trajectory data based on cell parameters of visited cells in a user equipment trajectory. The user equipment further comprising a transmitting port configured to send the cell change information to another user equipment or a network node to be used in performing at least one network task.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Overview of a User Equipment Cell Change

Figure 1:
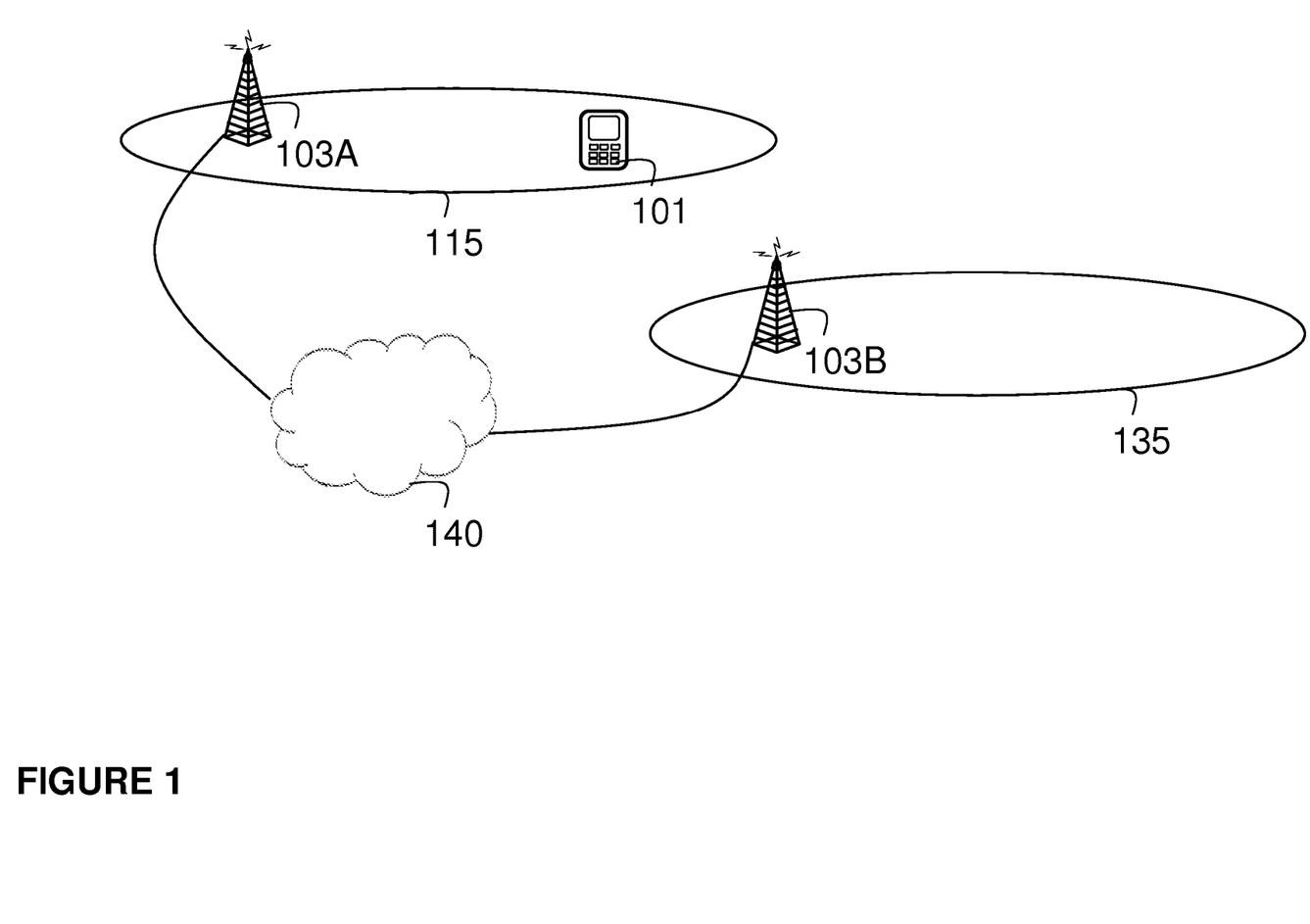
FIG. 1 is an illustrative example of a user equipment cell change.

For purposes of explaining the example embodiments, a problem will first be identified and discussed. FIG. 1 depicts a wireless communications network 100. The network 100 comprises a first network node 103A, e.g., a base station, serving a first cell 115. A user equipment 101 is present within the first cell 115, is served by the first base station 103A, and is therefore capable of communicating with the first base station 103A over a radio carrier. The user equipment 101 may be a mobile phone, a Personal Digital Assistant (PDA), or any other LTE network unit capable to communicate with a base station over a radio channel.

The LTE system 100 may further comprise one or more second network nodes 103B, e.g., base stations, serving one or more second cells 135. In FIG. 1, one second base station 103B and one second cell 135 is depicted. The first base station 103A and the second base station 103B may be connected to a core network 140.

Figure 2:
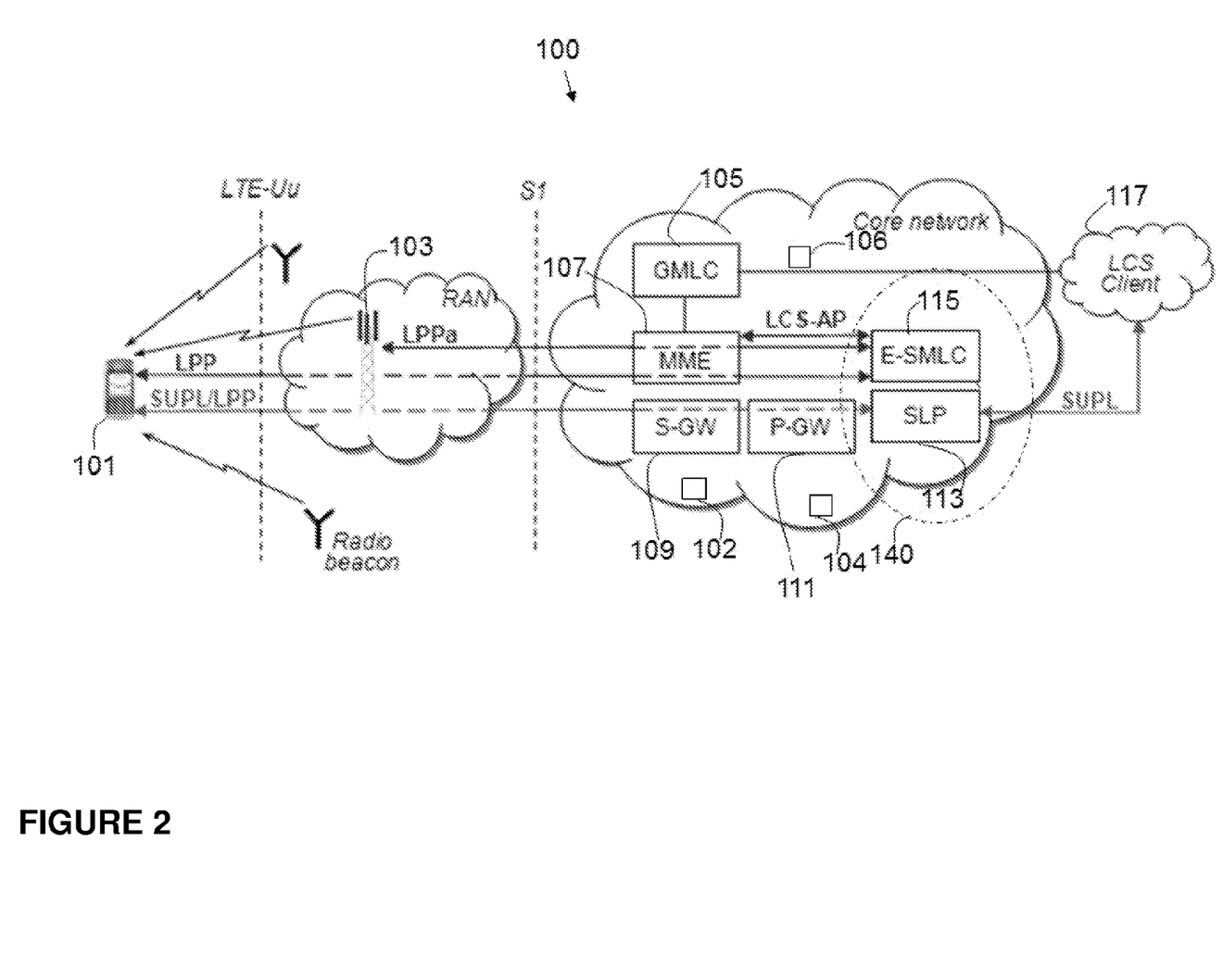
FIG. 2 is an illustrative example of LTE positioning architecture.

FIG. 2 illustrates positioning architecture in an LTE system which features the positioning node 140. The positioning architecture may comprise the user equipment 101 which may be configured to perform positioning measurements. The user equipment 101 may be in communication with a base station 103 (e.g., base station 103A or 103B). The base station 103 may be in communication with a core network comprising a Serving Gateway (SGW) 109, a Packet Data Network Gateway (PGW) 111 and a Mobility Management Entity (MME) 107. The base station 103 may also be in communication with a Location Measurement Unit (LMU) 102 which may assist in performing measurements. The core network may also comprise a number of positioning nodes, for example, a Gateway Mobile Location Centre (GMLC) 105, an Enhanced Serving Mobile Location Centre (E-SMLC) 115 and/or a Secure User Plane Location Platform (SLP) 113. SLP 113 may comprise two components, SPC 113*b* and SLC 113*a*, which may also reside in different nodes. According to some of the example embodiments, SPC 113*b* has a proprietary interface with E-SMLC 119, and Llp interface with SLC 113*a*, and the SLC part of SLP 113 communicates with P-GW (Packet Data Network Gateway) and External LCS Client.

The GMLC 105 may be used to request routing information from the Home Location register (HLR) or Home Subscriber Server (HSS). The GMLC 105 may also be used to positioning requests to the Visited Mobile Switching Centre (VMSC), Serving GPRS Support Node (SGSN) or Mobile Switching Centre (MSC) Server and receive final location estimates from the corresponding entity. The E-SMLC 115 may communicate with the user equipment 101 for location services and assistance data delivery using an LPP protocol. The E-SMLC 115 may also communication with the base station 103 of assistance data purposes using an LPPa protocol. The SLP 113 may be responsible for coordination and administrative functions to provide location services. The SLP 113 may also be responsible for positioning functions. The SLP 113 is a positioning node in the user plane.

When the user equipment 101 is situated in a cell, the user equipment may keep a record of information associated with the cell. An example of such information may be cell identification. However, when the user equipment 101 performs a cell change 105, e.g., as a result of a mobility procedure, and moves to a different cell, e.g., cell 135, the user equipment memory is typically flushed. It should be appreciated that a cell change may not necessary result in a change of a serving base station.

Thus, information (e.g., cell identification and/or measurement specific information) is lost. In the current standard, RSTD measurement reporting includes the SFN of the reference cell, but due to a cell change, the reference cell may not be the serving cell and may not be in the OTDOA assistance data at all.

According to some of the example embodiments, the measurement bandwidth information may be lost when, e.g. the measurement is performed during a cell change. For some measurements, the user equipment may have to adjust the measurement bandwidth of another cell, e.g. depending on the system bandwidth of the serving cell, and the measurement requirements may thus be different. However, if the final result is reported without the bandwidth information, it may be difficult for a network node to analyse, e.g. the reason for a certain quality level of the received measurement. User equipment positioning may also benefit from knowing the "cell path" of the user equipment. Since the cell information does not necessarily comprise the information about cells of the currently serving system but may also be of the other system (e.g., previously serving WiFi node(s) may be reported to a currently serving cell of an LTE system), and thus the information may be very useful for optimizing mobility and radio resource management.

Therefore, example embodiments are presented herein which allow for the recordation or a user equipment trajectory and the management of radio resources based on the recorded trajectory.

Recording User Equipment Trajectory

According to some of the example embodiments, a user equipment 101 may be configured to record data associated with a cell the user equipment is currently associated with. Some of the example embodiments further comprise the user equipment retaining such information upon leaving such cell. Thus, the user equipment may retain information associated with a user equipment trajectory and various cell changes.

According to some of the example embodiments, there are various signalling procedures and configuration methods for obtaining the information associated with the cell change of the user equipment. The information may be obtained from the user equipment and/or from a suitable network node which may serve the user equipment.

The following nodes may be involved in communicating information associated with cell changing. It should be appreciated that the examples provided herein are non-limiting.

The user equipment may receive, e.g., via LPP or RRC, a request or indication to collect and report the information associated with cell changing. The information associated with cell changing may be collected, stored and signalled by the user equipment to another node, e.g., positioning node, eNodeB, LMU, MDT node, SON node, etc.

Radio nodes may also be involved in the communication of information associated with cell changes. The radio node may receive, e.g., via LPPa, a request or indication to collect and report the information associated with cell changing. The information associated with cell changing may be collected, stored and signalled by the radio node to another node, e.g., another radio node, LMU, positioning node, SON node, MDT node, etc. The information associated with cell changing may be received from the user equipment. The information associated with cell changing may be received from another radio node, e.g., eNodeB or LMU, e.g., via X2 in a handover command or other signalling.

Various other network nodes may also be involved in the communication of information associated with cell changes. The network node may send a request or indication to the user equipment to collect and report the information associated with cell changing. The network node may send a request or indication to the radio node to collect and report the information associated with cell changing. The network node may send a request to another network node and receive the information associated with cell changing for a specific user equipment or the statistics of the information associated with cell changing collected over time and/or for a group of user equipments.

The information associated with cell changing may be received from a user equipment. The information associated with cell changing may be received from another network node, e.g., positioning node, SON node, MDT node, etc. The information associated with cell changing may also be received from a radio node.

The information associated with cell changing may comprise user equipment trajectory information. The user equipment trajectory information may further comprise at least a list of cell IDs or ordered sequence of cell IDs of cells on which the user equipment is connected to or camped on during certain time period. The order of the list may be in order of cell changes over time.

In some of the example embodiments, all cells over a predetermined period may be comprised in the user equipment recordation. In some example embodiments, only cells on which the user equipment camps on or connects to for at least certain minimum time are included. In some example embodiments, the list of cells may be obtained over a time period, which is associated with certain type of measurement, e.g., time over which user equipment does and logs MDT measurements, e.g. up to 24 hours for MDT. In some example embodiments, the time period over which cell change information is to be obtained is linked to positioning measurement session or period, e.g., the time interval of one RSTD measurement session, etc.

The user equipment may also report an ordered sequence (cell_ID1, cell_ID2, . . . , cell_IDN), where the cells with cell_ID1, cell_ID2, . . . , cell_IDN had been the serving/primary cells during the said time interval or one positioning measurement session, e.g. for OTDOA or E-CID. The user equipment may either report the physical cell ID (PCI) or cell global ID (CGI). The user equipment may be configured by the network node to report certain type of cell identifier.

Cells in the list/sequence may also be time-stamped, e.g., together with the cell identifiers. The time stamped information may be provided in different manners. In some example embodiments, the user equipment may provide the time for a cell when the user equipment was initially connected to/camped on to that cell. In some example embodiments, the user equipment may provide the time for a cell when the user equipment left the serving cell. In some example embodiments, the time stamp for a cell may correspond to the time during which user equipment was connected to or camped on to that cell. The user equipment may report a relative time-stamp for each cell in the list. The relative time may be a time reference to a time provided by the network node or a time-stamp corresponding to the last serving/primary cell or to a reference cell. The user equipment may also be configured by the network node to report the time-stamp for each serving cell according to any of the examples listed above.

The user equipment may also be configured with sets of cell IDs (e.g. first set and second set), which may indicate the start and end of the tracking of the trajectory. For example when the serving/primary cell belongs to first set of cell IDs, the user equipment may start the logging of the trajectory information and stop the logging when the serving/primary cell belongs to the second set of cell IDs. The network may also configure the time period. For example, after the expiry of this time the user equipment may stop the logging the trajectory information even if the user equipment does not find a serving/primary cell whose cell ID matches the second set of cell IDs. Another non-limiting example of the first cell IDs may be associated with the first type of cells, e.g., large or macro cells, and of the second set of cell IDs may be associated with the second type of cells, e.g., small cells such as femto or pico cells.

The user equipment may also be configured by the network node to report at least N (e.g. N=5) neighbour cells of each serving/PCell or specific serving cell/PCell as part of the trajectory information. The user equipment may therefore acquire and store all neighbour cells for the given serving cell/PCell and report the results to the network node. As a special case the user equipment may also be configured by the network node to report at least the strongest neighbour cell and/or weakest neighbour cell of each serving/PCell or specific serving cell/PCell as part of the trajectory information.

The user equipment may also be configured to record cell identification information (which may be used independently, regardless on whether the trajectory information is used in the network or not) for at least one cell in the list/sequence. Examples of such cell identification may be a last serving/primary cell during a predetermined time interval, a carrier frequency of each cell during the predetermined time interval, the first serving/primary cell during the predetermined time interval, the cell that has been the serving/primary cell during the longest time within the predetermined time interval, the cell(s) selected according to a pre-defined rule, the cell(s) on a certain frequency, and/or the cell(s) of a certain type, e.g., CSG cells, macro cells, pico cells, etc.

The user equipment may also be configured to record cell identification information with respect to signal measurements. Specifically, the user equipment may be configured to record signal measurement, e.g. RSRP, RSRQ, results of serving/primary cell. Examples of such measurements results may be the smallest and largest values of certain measurements done on serving/primary cell while the user equipment is connected to/camped on this cell, and/or values of the certain measurements done on serving/primary cell when the user equipment initially connects to/camps on this cell and/or when user equipment leaves this cell.

According to some of the example embodiments, further examples of cell information (relating to measurements) may comprise an indication of a cell type for at least one cell in the list/sequence, and/or bandwidth information for at least one cell in the list/sequence. Example of such bandwidth information may comprise a system bandwidth (aka channel bandwidth, cell transmission bandwidth, etc.), and/or a measurement bandwidth (the bandwidth used for doing specific type(s) of measurement(s)). Some non-limiting examples of such bandwidths are a cell measurement bandwidth, specific signal, e.g. PRS, measurement bandwidth, SRS measurement bandwidth, a smallest measurement bandwidth of serving/primary cells, e.g., among all serving/primary cells, during the said intervals, a largest measurement bandwidth of serving/primary cells, e.g., among all serving/primary cells, during the said intervals, a smallest system/transmission/channel bandwidth of serving/primary cells, e.g., among all serving/primary cells, during the said intervals, and/or a largest system/transmission/channel bandwidth of all serving/primary cells, e.g., among all serving/primary cells, during the said intervals.

According to some example embodiments, the user equipment may also be configured to record bandwidth information associated with the entire reported measurement during which at least one cell change occurred. Examples of such information may be a measurement bandwidth based on which the measurement reporting time is to be defined (this information may be particularly important, e.g., for testing measurement requirements). The user equipment may also be configured to record a cell type. Examples of such cell types may be macro, micro, pico, femto, etc.

The user equipment may also be configured to record cell access information. For example, the user equipment may be configured to indicate whether a cell is fully, partially, or not accessible to all user equipments. Examples of such information may be CSG cells, non-CSG, hybrid CSG, any restricted or barred cell, cell barred for specific Operation/services etc., proximity; whether a cell is in proximity of CSG etc., frequency associated with the at least one cell, and/or timing information, e.g., SFN, associated with the at least one cell.

According to some of the example embodiments, the information associated with cell changing may be provided upon request or when configured, e.g., a configuration message may indicate which elements of the said information are to be provided. According to some example embodiments, the recordation of information may also be utilized for certain measurements, e.g., for MDT measurements, for E-CID, OTDOA, UTDOA or other positioning measurements, for a measurement during which at least one cell change has occurred, etc.

It should be appreciated that the user equipment trajectory information may be provided by the user equipment in any RRC state e.g., idle state, connected state, low activity states, e.g., CELL_PCH, URA_PCH, CELL_FACH states etc. It should also be appreciated that all the examples of recorded cell information also be obtained by the user equipment for the neighbour cells associated with each serving/PCell while obtaining the cell change/trajectory information.

Figure 3:
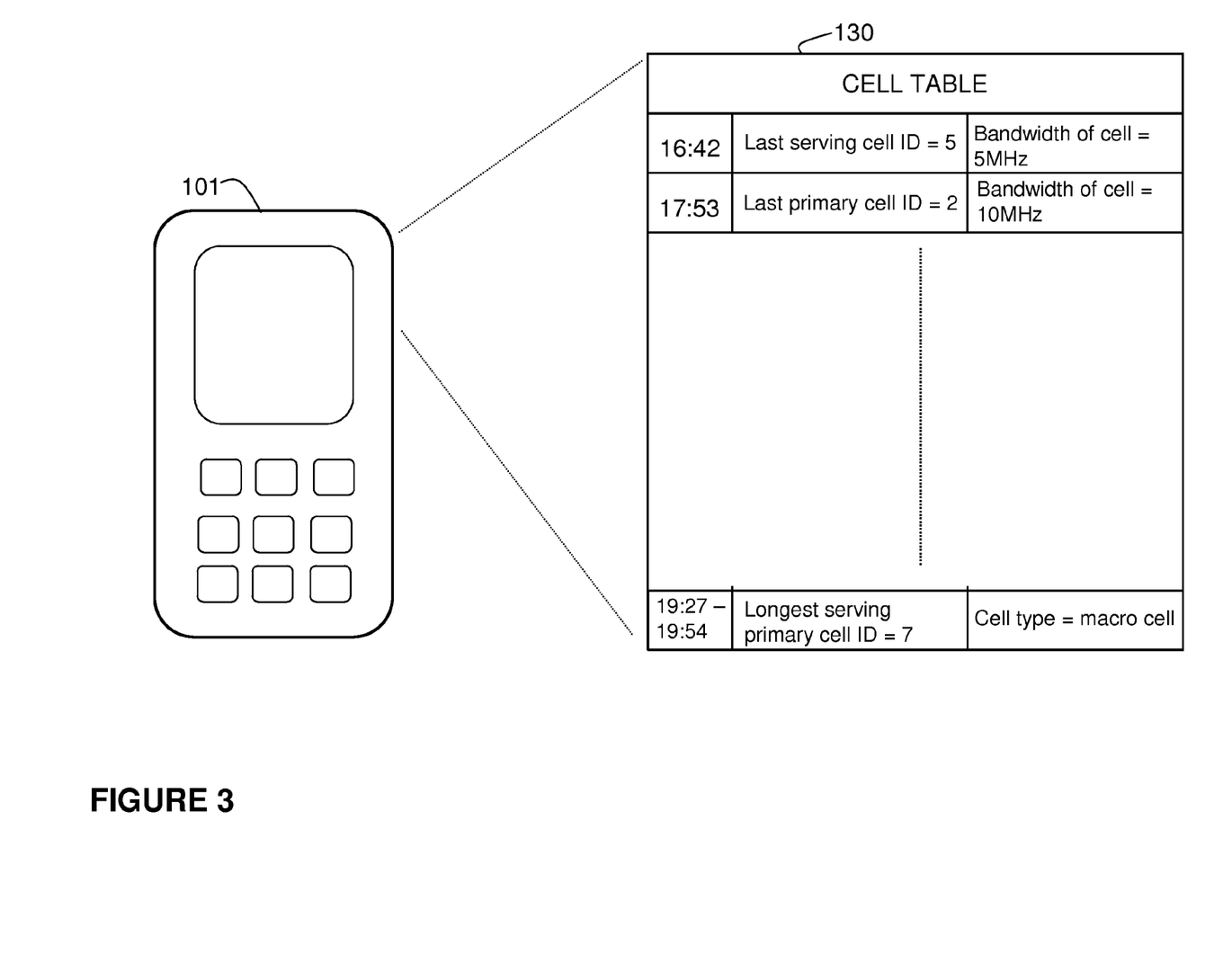
FIG. 3 is an illustrative example of a user equipment recordation, according to some of the example embodiments.

FIG. 3 illustrates an example of a recorded user equipment trajectory. In some example embodiments, the user equipment 101 may be configured to store the user equipment trajectory information internally, for example, in the form of a cell table 130. As shown, the cell table 130 may comprise any number of entries, where each entry may comprise any number of fields. In the example provided in FIG. 2, each entry may be time stamped, as described above. Furthermore, the table may comprise any number of different entry types. In the example provided in FIG. 3, the cell table 130 comprises a last serving cell ID, a first primary cell, and a longest serving primary cell ID entry.

It should be appreciated that the use of a cell table is used merely for the purpose of explanation and any other form of recordation or listing may be utilized. Furthermore, the recordation techniques described above are also presented as examples. Any form of cell related information may be recorded and used for the management of radio resources. It should be appreciated that the information described above may be useful in optimizing measurement configurations, activity/inactivity periods, and/or location determination, etc.

Example Network Node Configuration

Figure 4:
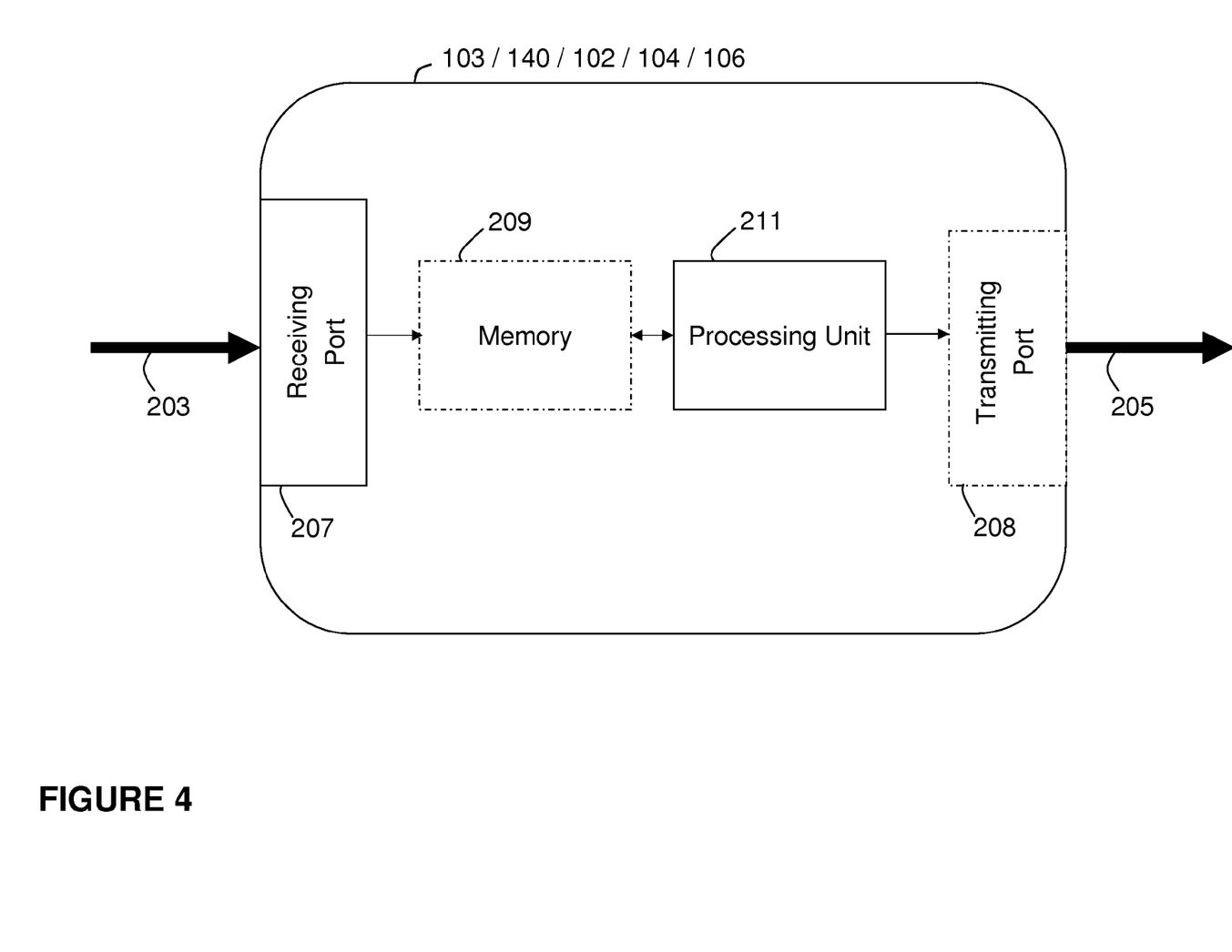
FIG. 4 is an example configuration of a network node, according to some of the example embodiments.

FIG. 4 provides an illustrative example of a network node configuration, according to some of the example embodiments. It should be appreciated that a network node may be a base station 103, a positioning node 140, e.g., a E-SMLC 115 or a SLP 113, a Location Measurement Unit (LMU) 102, a Minimization of Drive Test (MDT) unit 104, or a Self Organizing Network (SON) 106. The network node may comprise any number of communication ports, for example a receiving port 207 and a transmitting port 208. The communication ports may be configured to receive and transmit any form of communications data 203 and 205, respectively. It should be appreciated that the network node may alternatively comprise a single transceiver port. It should further be appreciated that the communication or transceiver port may be in the form of any input/output communications port known in the art.

The network node may further comprise at least one memory unit 209 that may be in communication with the receiving port 207 and/or the transmitting port 208. The memory unit 209 may be configured to store received, transmitted, and/or measured data of any kind, e.g., user trajectory information and/or management instructions, and/or executable program instructions. The memory unit 209 be any suitable type of computer readable memory and may be of a volatile and/or non-volatile type.

The network node may also comprise a processing unit 211 that may be configured to perform any number of network tasks or management of radio resources based on user equipment trajectory data and/or cell change data.

It should be appreciated that processing unit 211 may be any suitable type of computation unit, e.g., a microprocessor, digital signal processor (DSP), field programmable gate array (FPGA), or application specific integrated circuit (ASIC), or any form of processing circuitry. It should also be appreciated that the processing unit 211 need not be comprised as a single unit but may also be comprised as any number of units.

Example User Equipment Configuration

Figure 5:
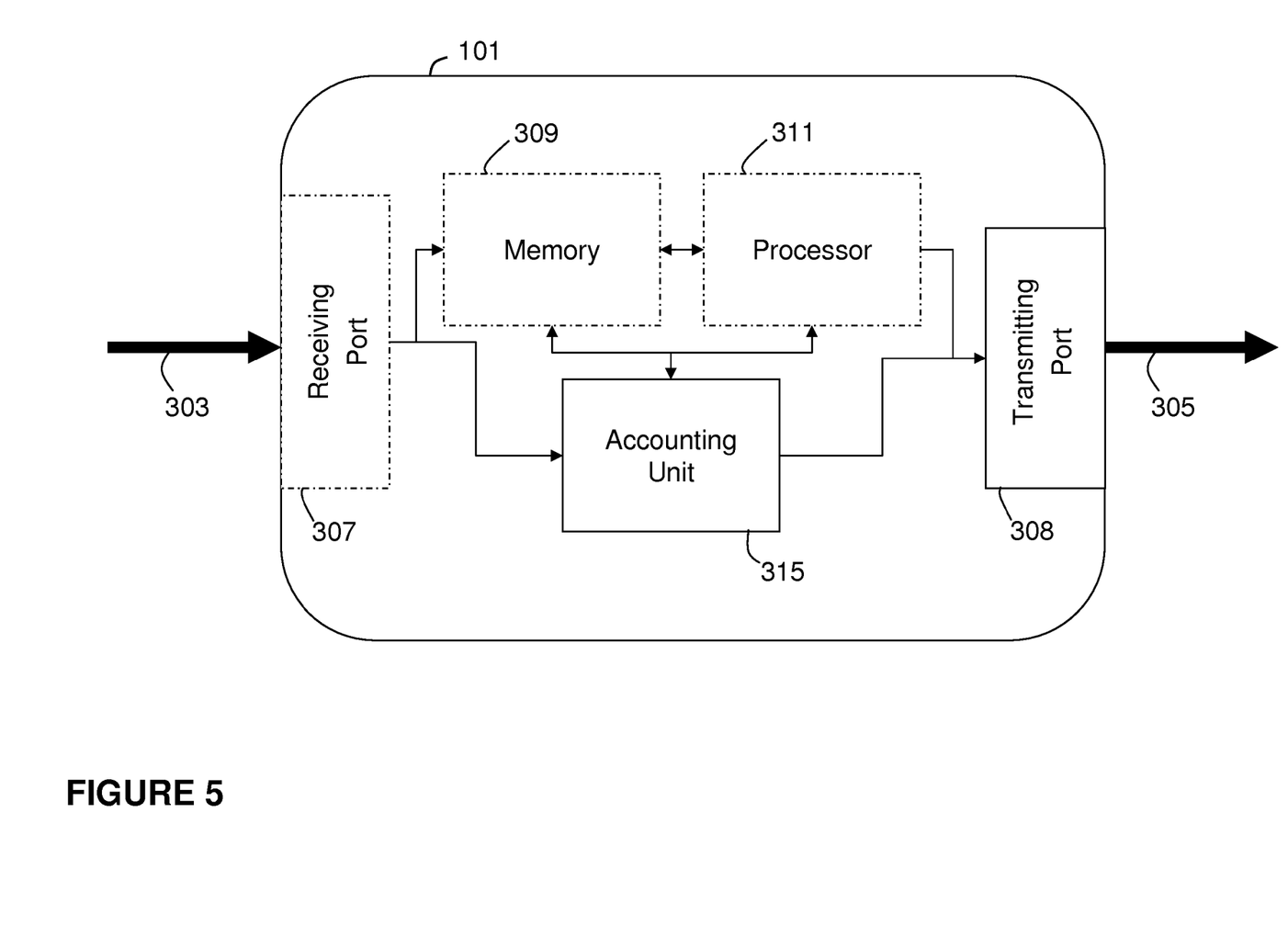
FIG. 5 is an example configuration of a user equipment node, according to some of the example embodiments.

FIG. 5 illustrates an example of a user equipment node 101, according to some of the example embodiments. The user equipment 101 may comprise any number of communication ports, for example a receiving port 307 and a transmitting port 308. The communication ports may be configured to receive and transmit any form of communications data 303 and 305, respectively. It should be appreciated that the user equipment 101 may alternatively comprise a single transceiver port. It should further be appreciated that the communication or transceiver port may be in the form of any input/output communications port known in the art.

The user equipment 101 may further comprise at least one memory unit 309 that may be in communication with the receiving port 307 and/or the transmitting port 308. The memory unit 309 may be configured to store received, transmitted, and/or measured data of any kind, e.g., user trajectory information and/or management instructions, and/or executable program instructions. The memory unit 309 be any suitable type of computer readable memory and may be of a volatile and/or non-volatile type.

The user equipment 101 may also comprise an accounting unit 315 that may be configured to account for or store cell change information and user trajectory data. The user equipment 101 may further comprise a general processing unit 311.

It should be appreciated that the accounting unit 315, and/or the processing unit 311 may be any suitable type of computation unit, e.g. a microprocessor, digital signal processor (DSP), field programmable gate array (FPGA), or application specific integrated circuit (ASIC), or any form of processing circuitry. It should also be appreciated that the accounting unit 315, and/or the processing unit 311 need not be comprised as separate units. The accounting unit 315, and/or the processing unit 311 may be comprised as a single computational unit or any number of units. It should also be appreciated that the user equipment 100 may be a mobile phone, a Personal Digital Assistant (PDA), or any other LTE network unit capable to communicate with a base station over a radio channel.

Example Network Node Operations

Figure 6:
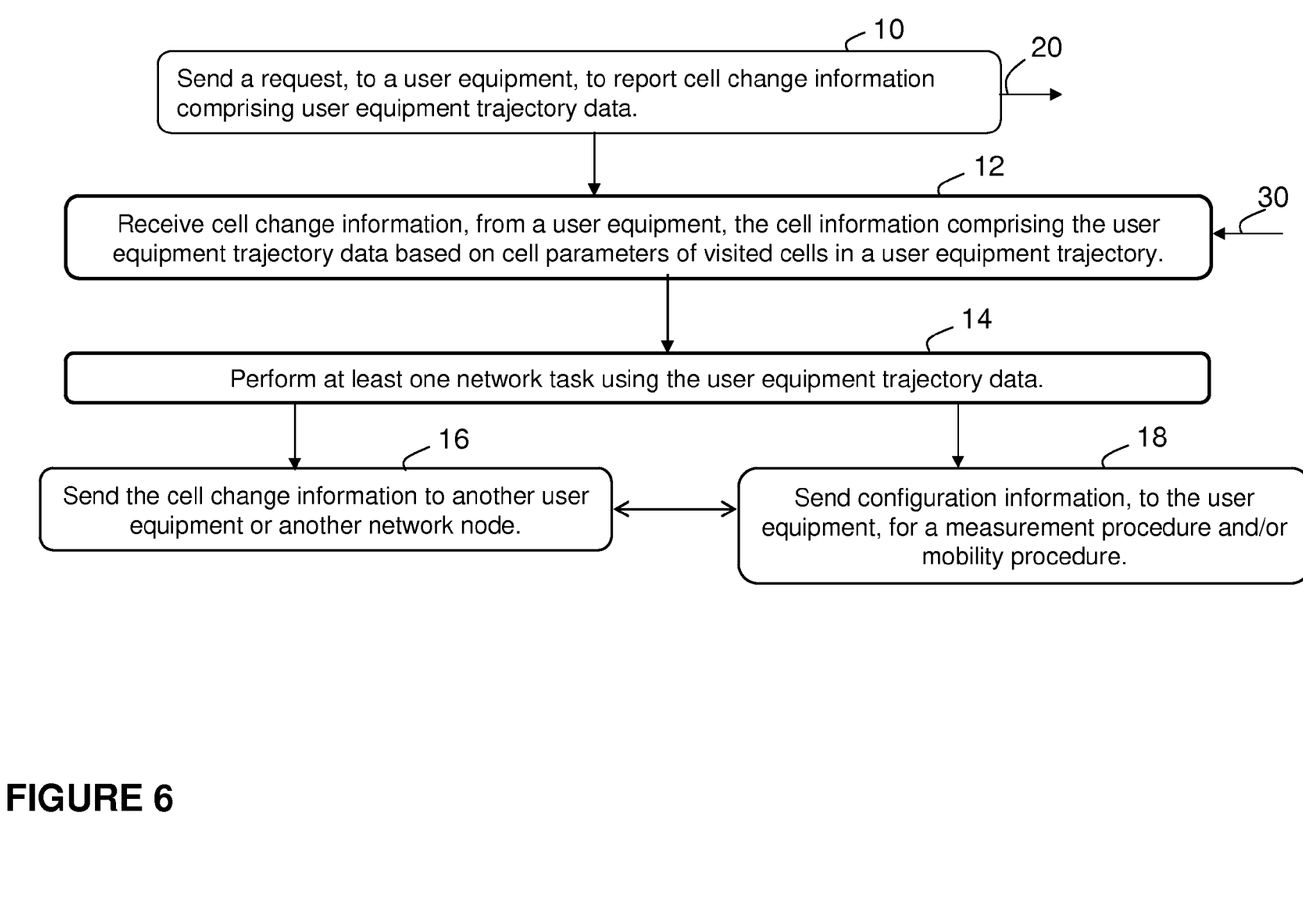
FIG. 6 is a flow diagram depicting example operations of the network node of FIG. 4, according to some of the example embodiments.

FIG. 6 illustrates example operations which may be performed by the network node of FIG. 4, according to some of the example embodiments. The example operations are directed towards the performing of network tasks. A current cell change refers to a user equipment 101 changing the cell of which the user equipment is currently situated. A visited cell may comprise a camping, connected, primary, and/or serving cell. It should also be appreciated that the network node may be a base station, a positioning node, e.g., an E-SMLC or a SLP, a Location Measurement Unit (LMU), a Minimization of Drive Test (MDT) unit, or a Self Organizing Network (SON).

Example Operation 10

According to some of the example embodiments, the network node may be configured to send 10 a request to a user equipment 101 to report cell change information comprising user equipment trajectory data. The transmitting port 208 may be configured to send the request to the user equipment. In some example embodiments, the request may be one of a time-based, event-triggered, or rule-based request.

Operation 12

The network node is configured to receive 12 cell change information, from a user equipment 101 or another network node. The cell change information comprises user equipment trajectory data based on cell parameters of visited cells in a user equipment trajectory. The receiving port 207 is configured to receive the cell change information from the user equipment or the other network node.

According to some of the example embodiments, the cell change information may comprise any one or more of a cell identifier of a first serving cell in the user equipment trajectory, a cell identifier of a last serving cell in the user equipment trajectory, cell identifiers of primary serving cells and/or secondary serving cells utilized by the user equipment, a carrier frequency of a visited cell, timing information associated with a visited cell, a time duration over which the user equipment is connected to or camped on a visited cell, a visited cell type, signal measurement results, a visited cell bandwidth, and/or neighbour cell change information associated with one or more serving cells in the user equipment trajectory.

According to some of the example embodiments, the user trajectory data may be time-stamped based on when the user trajectory data was recorded. According to some of the example embodiments, the cell change information may be acquired by the user equipment during at least one mobility procedure. The mobility procedure may be a handover procedure, cell reselection, RRC connection re-establishment, RRC connection release with redirection to a target cell, a PCell change on same frequency as a PCC in a multi-carrier system, a PCell change due to change of PCC in a multi-carrier system, a serving cell set change in a multi-carrier system, or an active cell set change in a multi-carrier system. According to some of the example embodiments, the user trajectory data is collected by the user equipment in an idle state, low activity state and/or connected state.

Operation 14

The network node is also configured to perform at least one network task using the cell change information. The processing unit 211 is configured to perform the at least one network task.

According to some example embodiments, the at least one network task may be positioning a user equipment, tracking or determining a user equipment travel route or path, automated tuning or updating of one or more network parameters, network planning and/or deployment of new network nodes or base station sites, optimization and/or improvement of parameters related to a mobility procedure.

Example Operation 16

According to some of the example embodiments, the performing 14 may also comprise sending 16, to another user equipment and/or another network node, the cell change information to be used for performing at least one other network task. The transmitting port 208 may be configured to send the cell change information to another user equipment and/or another network node.

According to some example embodiments, the at least one other network task may be positioning a user equipment, tracking or determining a user equipment travel route or path, automated tuning or updating of one or more network parameters, network planning and/or deployment of new network nodes or base station sites, optimization and/or improvement of parameters related to a mobility procedure.

Example Operation 18

According to some of the example embodiments, the performing 14 may further comprise sending 18, to the user equipment or another network node, configuration information for a measurement procedure and/or a mobility procedure. The configuration information may comprise one or more parameters based on the received cell change information. The processing unit 211 may be configured to provide the configuration information and the transmitting port 208 may be configured to send the configuration information to the user equipment or the other network node.

According to some of the example embodiments, the configuration information may comprise instructions for altering a measurement scheme carried out by the user equipment.

Example User Equipment Operations

Figure 7:
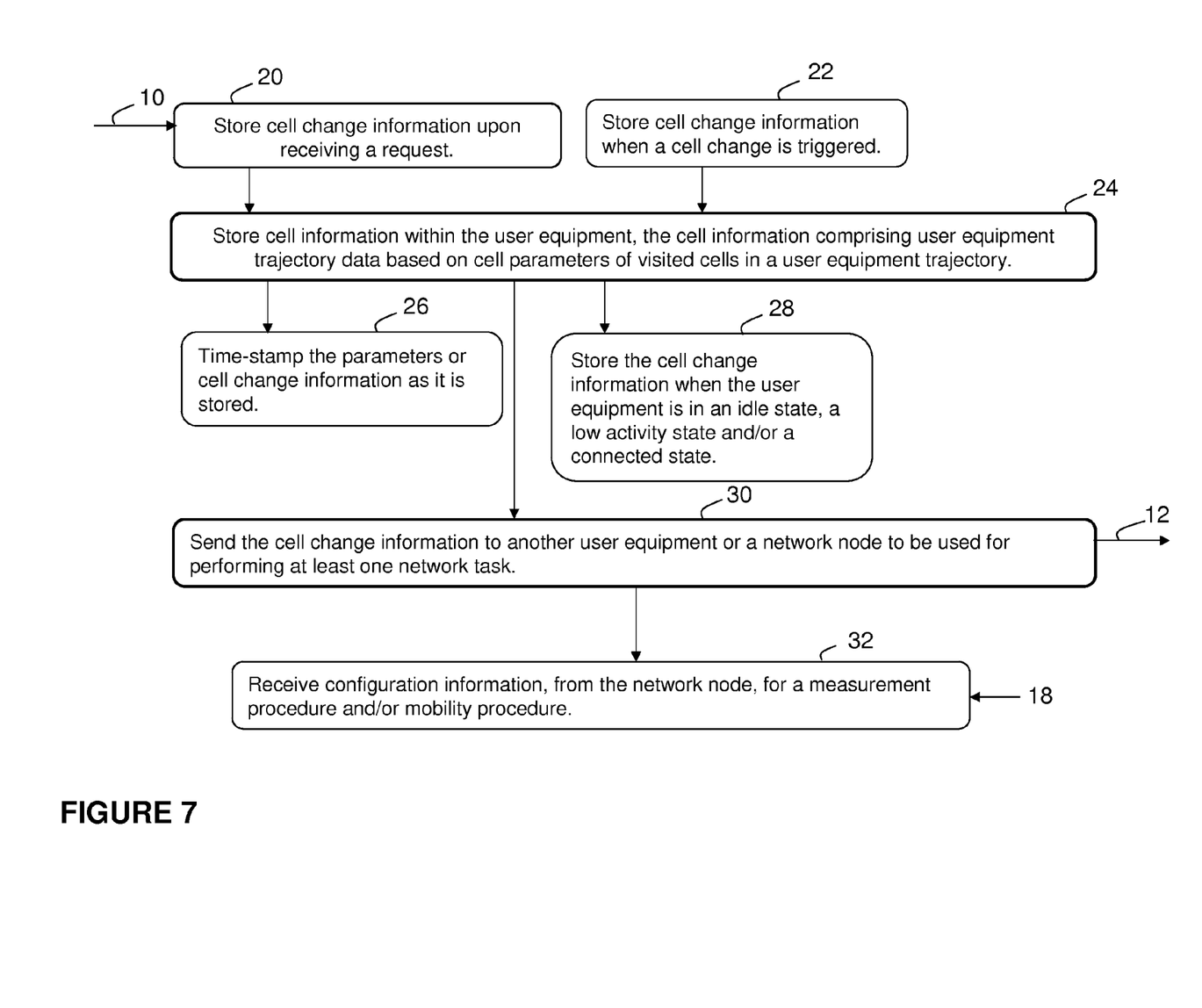
FIG. 7 is a flow diagram depicting example operations of the user equipment of FIG. 5, according to some of the example embodiments.

FIG. 7 illustrates example operations which may be performed by the user equipment 101 of FIG. 5, according to some of the example embodiments. According to some example embodiments the visited cells may comprise camping, connected, primary, and/or serving cells. The network node may be a base station, a positioning node, e.g., a E-SMLC or a SLP, a Location Measurement Unit (LMU), a Minimization of Drive Test (MDT) unit, or a Self Organizing Network (SON). The example operations are directed towards the accounting or recordation of information associated with at least one cell in a user equipment trajectory.

Example Operation 20

According to some of the example embodiments, the user equipment 101 may be configured to store cell change information upon receiving a request, from the network node, another user equipment or within the user equipment. The receiving port 307 may be configured to receive the request.

According to some of the example embodiments, the request is any one of a time-based, event-triggered, or rule-based request. According to some of the example embodiments, the rule-based request may comprise instructions for storing the cell change information when a pre-defined measurement is being performed during a user equipment cell change. According to some of the example embodiments, the pre-defined measurement is a MDT, E-CID, OTDOA, an UTDOA, SON and/or mobility measurement. According to some of the example embodiments, a mobility measurement may be at least one of an Evolved Universal Terrestrial Radio Access Reference Signal Received Power, E-UTRA RSRP, Evolved Universal Terrestrial Radio Access Reference Signal Receive Quality, E-UTRA RSRQ, Universal mobile telecommunications system Terrestrial Radio Access Frequency Division Duplex Common Pilot Channel Received Signal Code Power, UTRA FDD CPICH RSCP, Universal mobile telecommunications system Terrestrial Radio Access Frequency Division Duplex carrier Received Signal Strength Indicator, UTRA FDD carrier RSSI, Universal mobile telecommunications system Terrestrial Radio Access Frequency Division Duplex Common Pilot Channel Energy per Chip over Noise, UTRA FDD CPICH Ec/No, Global System for Mobile communications carrier Received Signal Strength Indicator, GSM carrier RSSI, and/or Code Division Multiple Access 2000 1x Round Trip Time Pilot Strength, CDMA2000 1x RTT Pilot Strength.

Operation 24

The user equipment 101 is configured to store 24 the cell change information within the user equipment 101, the cell change information comprising user equipment trajectory data based on cell parameters of visited cells in a user equipment trajectory. The accounting unit 315 is configured to perform the storing.

According to some of the example embodiments, the cell change information may comprise any one or more of a cell identifier of a first serving cell in the user equipment trajectory, a cell identifier of a last serving cell in the user equipment trajectory, cell identifiers of primary serving cells and/or secondary serving cells utilized by the user equipment, a carrier frequency of a visited cell, timing information associated with a visited cell, a time duration over which the user equipment is connected to or camped on a visited cell, a visited cell type, signal measurement results, a visited cell bandwidth, and/or neighbour cell change information associated with one or more serving cells in the user equipment trajectory.

According to some of the example embodiments, the cell change information may be acquired by the user equipment during at least one mobility procedure. The mobility procedure may be a handover procedure, cell reselection, RRC connection re-establishment, RRC connection release with redirection to a target cell, a PCell change on same frequency as a PCC in a multi-carrier system, a PCell change due to change of PCC in a multi-carrier system, a serving cell set change in a multi-carrier system, or an active cell set change in a multi-carrier system.

Example Operation 26

According to some example embodiments the storing 24 may further comprise time-stamping 26 the cell information as the cell information is stored within the user equipment. The accounting unit 315 may be configured to time-stamping the cell information as it is recorded.

Example Operation 28

According to some example embodiments the storing 24 may further comprise storing 28 the cell change information when the user equipment is in an idle state, low activity state and/or connected state. The accounting unit 315 may be configured to store the cell change information when the user equipment is in an idle state, low activity state and/or connected state.

Operation 30

The user equipment 101 is further configured to send 30 the cell change information to another user equipment or a network node to be used for performing at least one network task. The transmitting port 308 is configured to send the cell change information.

According to some example embodiments, the at least one network task may be positioning a user equipment, tracking or determining a user equipment travel route or path, automated tuning or updating of one or more network parameters, network planning and/or deployment of new network nodes or base station sites, optimization and/or improvement of parameters related to a mobility procedure.

Example Operation 32

According to some of the example embodiments, the user equipment may be further configured to receive 32, from the network node, configuration information for a measurement procedure and/or a mobility procedure. The configuration information may comprise one or more parameters based on the transmitted cell change information. The receiving port 307 may be configured to receive the configuration instructions. According to some of the example embodiments, the configuration information may comprise instructions for altering a measurement scheme carried out by the user equipment.

CONCLUSION

Although the description is mainly given for a user equipment, as measuring or recording unit, it should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station). The example embodiments may apply for non-CA user equipment or both for user equipments capable and not capable of performing inter-frequency measurements without gaps, e.g. also including user equipments capable of carrier aggregation.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or muti-RAT node. A multi-RAT node may comprise a node with co-located RATs or supporting multi-standard radio (MSR) or a mixed radio node.

A coordinating node coordinating other network or radio network nodes and/or receiving/transmitting the information or coordination messages associated with cell change may be present in the network. Example nodes that may take the coordinating node role, at least in part, are SON node, MDT node, positioning node, O&M node, etc.

The example embodiments are not limited to LTE, but may apply with any RAN, single- or multi-RAT. Some other RAT examples are LTE-Advanced, UMTS, HSPA, GSM, cdma2000, HRPD, WiMAX, and WiFi.

The foregoing description of the example embodiments have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some example embodiments may comprise a portable or non-portable telephone, media player, Personal Communications System (PCS) terminal, Personal Data Assistant (PDA), laptop computer, palmtop receiver, camera, television, and/or any appliance that comprises a transducer designed to transmit and/or receive radio, television, microwave, telephone and/or radar signals.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications may be made to these embodiments. Furthermore, it should be appreciated that the example embodiments presented herein may be used in any combination with one another. Accordingly, although specific terms are employed, they are used in a generic and descriptive sense only and not for purposes of limitation, the scope of the embodiments being defined by the following claims.

The invention claimed is:

1. A method in a network node for performing network tasks, the network node being comprised in a wireless communications network, the method comprising:
   sending a request to report cell change information, to a user equipment currently being served by the wireless communications network or another network node of the wireless communications network, the cell change information comprising user equipment trajectory data based on cell parameters of visited cells in a user equipment trajectory, wherein the visited cells include one cell in the wireless communications network currently serving the user equipment and the one cell served by a WiFi node, wherein the one cell in the wireless communications network currently serving the user equipment and one cell served by a WiFi node communicate with the user equipment using different radio access technologies, wherein the user equipment trajectory data for at least one of the visited cells includes a time-stamp, a signal measurement, and a measurement bandwidth, wherein the signal measurement is at least one of a Minimization of Drive Test, MDT, measurement, positioning measurement, an Enhanced-Cell Identification, E-CID, measurement, an Observed Time Difference of Arrival, OTDOA, measurement, an Uplink Time Difference of Arrival, UTDOA, measurement, self organizing network, SON, measurement, and mobility measurement;
   receiving the requested cell change information from the user equipment; and
   performing at least one network task using the cell change information, wherein the at least one network task includes at least one of determining a user equipment travel route, network planning, planning a new network node site, deployment of a new network node, planning a new base station site, or deployment of a new base station site.

2. The method of claim 1, wherein the cell change information is collected by the user equipment in at least one of an idle state, a low activity state or a connected state.

3. The method of any of claim 1, wherein the request is one of a time-based event-triggered or a rule-based request.

4. A method in a user equipment for collecting cell change information associated with a cell change, wherein the user equipment is currently being served by a wireless communications network, the method comprising:
   receiving a request to store the cell change information within the user equipment, the cell change information comprising user equipment trajectory data based on cell parameters of visited cells in a user equipment trajectory, wherein the visited cells include one cell in the wireless communications network currently serving the user equipment and one cell served by a WiFi node, wherein the one cell in the wireless communications network currently serving the user equipment and the one cell served by a WiFi node communicate with the user equipment using different radio access technologies;
   performing a signal measurement of at least one of the visited cells, wherein the user equipment trajectory data for at least one of the visited cells includes a time-stamp, the signal measurement, and a measurement bandwidth, wherein the signal measurement is at least one of a Minimization of Drive Test, MDT, measurement, positioning measurement, an Enhanced-Cell Identification, E-CID, measurement, an Observed Time Difference of Arrival, OTDOA, measurement, an Uplink Time Difference of Arrival, UTDOA, measurement, self organizing network, SON, measurement, and mobility measurement;
   storing the cell change information; and
   sending the cell change information to another user equipment or a network node to be used in performing at least one network task, wherein the at least one network task includes at least one of sending the cell change information to another network node or another user equipment and sending configuration information to the user equipment or another network node.

5. The method of claim 4, wherein the mobility measurement is performed during at least one mobility procedure, said at least one mobility procedure being at least one of a handover procedure, cell reselection, Radio Resource Control, RRC, connection re-establishment, RRC connection release with redirection to a target cell, or a primary cell switching a primary carrier switching.

6. The method of claim 4, further comprising receiving, from the network node, at least one of configuration information for the signal measurement, said configuration information comprising one or more parameters based on the transmitted cell change information.

7. The method of claim 4, wherein the storing further comprises storing the cell change information when the user equipment is in at least one of an idle state, low activity state or a connected state.

8. A network node for performing network tasks, the network node being comprised in a wireless communications network, the network node comprising:
   a transmitting port configured to send a request for cell change information, to a user equipment currently being served by the wireless communications network, the cell change information comprising user equipment trajectory data based on cell parameters of visited cells in a user equipment trajectory, wherein the visited cells include one cell in the wireless communications network currently serving the user equipment and one cell served by a WiFi node, wherein the one cell in the wireless communications network currently serving the user equipment and the one cell served by a WiFi node communicate with the user equipment using different radio access technologies, wherein the user equipment trajectory data for at least one of the visited cells includes a time-stamp, a signal measurement, and a measurement bandwidth, wherein the signal measurement is at least one of a Minimization of Drive Test, MDT, measurement, positioning measurement, an Enhanced-Cell Identification, E-CID, measurement, an Observed Time Difference of Arrival, OTDOA, measurement, an Uplink Time Difference of Arrival, UTDOA, measurement, self organizing network, SON, measurement, and mobility measurement;

a receiving port configured to receive the cell change information from the user equipment; and processing unit configured to perform at least one network task using the cell change information, wherein the at least one network task includes at least one of determining a user equipment travel route, network planning, planning a new network node site, deployment of a new network node, planning a new base station site, or deployment of a new base station site.

9. The network node of claim 8, wherein the cell change information is collected by the user equipment in at least one of an idle state, low activity or in a connected state.

10. The network node of claim 8, wherein the request is one of a time-based, an event-triggered, or a rule-based request.

11. A user equipment for collecting cell change information associated with a cell change, wherein the user equipment is currently being served by a wireless communications network, the user equipment comprising:

a receiving port configured to receive a request to store cell change information within the user equipment, the cell change information comprising user equipment trajectory data based on cell parameters of visited cells in a user equipment trajectory, wherein the visited cells include one cell in the wireless communications network currently serving the user equipment and one cell served by a WiFi node, wherein the one cell in the wireless communications network currently serving the user equipment and the one cell served by a WiFi node communicate with the user equipment using different radio access technologies;

a processor configured to perform a signal measurement of at least one of the visited cells, wherein the user equipment trajectory data for at least one of the visited cells includes a time-stamp, the signal measurement, and a measurement bandwidth, wherein the signal measurement is at least one of a Minimization of Drive Test, MDT, measurement, positioning measurement, an Enhanced-Cell Identification, E-CID, measurement, an Observed Time Difference of Arrival, OTDOA, measurement, an Uplink Time Difference of Arrival, UTDOA, measurement, self organizing network, SON, measurement, and mobility measurement;

an accounting unit configured to store the cell change information; and a transmitting port configured to send the cell change information to another user equipment or a network node to be used in performing at least one network task, wherein the at least one network task includes at least one of sending the cell change information to another network node or another user equipment and sending configuration information to the user equipment or another network node.

12. The user equipment of claim 11, wherein the mobility measurement is performed during at least one mobility procedure, said at least one mobility procedure is one of a handover procedure, cell reselection, Radio Resource Control, RRC, connect re-establishment, RRC connection release with redirection to a target cell, primary cell switching or a primary carrier switching.

13. The user equipment of claim 11, wherein the receiving port is further configured to receive, from the network node, at least one of configuration information for the signal measurement, said configuration information comprising one or more parameters based on the transmitted cell change information.

14. The user equipment of claim 11, wherein the accounting unit is further configured to store the cell change information when the user equipment is in at least one of an idle state, a low activity state or a connected state.

15. The user equipment of claim 11, wherein the network node is one of a base station, a positioning node, a Location Measurement Unit, LMU, a Minimization of Drive Test, MDT, node of a Self Organizing Network, SON, node.

* * * * *